United States Patent [19]

Ohtomo

[11] Patent Number: 5,715,223
[45] Date of Patent: Feb. 3, 1998

[54] METHOD OF MEASURING A DEVIATION BETWEEN A CENTERLINE BETWEEN GROOVES AND A CONTROL PREPIT PATTERN ON A DISC

[75] Inventor: Katsuhiko Ohtomo, Miyagi, Japan

[73] Assignee: Sony Corporation, Tokyo, Japan

[21] Appl. No.: 78,184

[22] PCT Filed: Oct. 30, 1992

[86] PCT No.: PCT/JP92/01412

§ 371 Date: Jun. 16, 1993

§ 102(e) Date: Jun. 16, 1993

[87] PCT Pub. No.: WO93/09536

PCT Pub. Date: May 13, 1993

[30] Foreign Application Priority Data

Oct. 31, 1991 [JP] Japan ................... 3-311522

[51] Int. Cl.[6] .................................................. G11B 7/00
[52] U.S. Cl. ........................................ 369/58; 369/44.26
[58] Field of Search ........................... 369/44.13, 44.26, 369/275.1, 111, 275.4, 54, 58, 44.29, 44.32, 44.34; 250/201.5

[56] References Cited

U.S. PATENT DOCUMENTS

| | | | |
|---|---|---|---|
| 4,748,609 | 5/1988 | Yonezawa et al. | 369/44.26 X |
| 4,949,331 | 8/1990 | Maeda et al. | 369/275.3 |
| 4,996,682 | 2/1991 | Yanagihara et al. | 369/275.4 |
| 5,084,860 | 1/1992 | Maeda et al. | 369/109 |

FOREIGN PATENT DOCUMENTS

| | | |
|---|---|---|
| 36 20 301 A1 | 1/1987 | Germany. |
| 38 37 745 A1 | 5/1989 | Germany. |
| 9108568 | 6/1991 | WIPO. |

Primary Examiner—Thang V. Tran
Attorney, Agent, or Firm—Limbach & Limbach L.L.P.

[57] ABSTRACT

A method for measuring a deviation between the centerline between grooves defined on both sides of a recording track of an optical disc of a sample servo tracking system and a control prepit pattern formed on the disc is disclosed. If the modulation indices of the wobbled pits are measured under continuous tracking control of the center region or land, a difference is produced in the modulation indices when there is a deviation between the center of the wobbled pits and the center of the grooves. If, under tracking control of the grooves, the tracking offset is adjusted so that the modulation indices of the wobbled pits are equal to each other, the tracking error signal has an offset quantity (DC component). A light beam is swept under tracking control of the land between the grooves and the deviation between the center of the grooves and the control prepit pattern is measured. The light beam is swept so that the playback outputs from the wobbles pits are equal to each other and the deviation between the control prepit pattern and the center of the grooves is measured by a tracking error signal of the land between the grooves.

4 Claims, 3 Drawing Sheets

METHOD OF MEASURING A DEVIATION BETWEEN A CENTERLINE BETWEEN GROOVES AND A CONTROL PREPIT PATTERN ON A DISC

TECHNICAL FIELD

This invention relates to a method for measuring the deviation between an arcuate centerline of two adjacent grooves on both sides of a recording track and a control prepit pattern of an optical disc of the sample servo tracking system.

BACKGROUND ART

Information signals are recorded on the optical disc by radiating a light beam from an optical pickup unit to the disc which is rotated at a constant linear velocity or a constant angular velocity. For accurate recording of the information signals, it is necessary for the light beam to track the recording track accurately.

Consequently, a variety of tracking systems, inclusive of the sample servo tracking system, have been proposed.

With the sample servo tracking system, tracking is achieved by a control prepit pattern formed on a disc substrate, instead of by a so-called pre-groove formed on the disc substrate. Consequently, in the optical disc of the sample servo tracking system, clock pits for clock synchronization and wobble pits for deriving tracking error signals are formed as a pre-pit pattern along the centerline of a recording track at the time of molding of the disc substrate.

Meanwhile, it has been pointed out with the optical disc of the sample servo tracking system that ghost pits or unusual polarization tends to be produced at the time of molding of the disc substrate. The present Assignee has already proposed providing grooves in a data area in the optical disc of the sample servo tracking system for overcoming these inconveniences.

The disc substrate provided with these grooves may be detached easily from a stamper at the time of molding, while being free from ghost pits or unusual polarization, so that an optical disc exhibiting superior optical characteristics may be produced.

When preparing the optical disc provided with these grooves, since it is impossible to cut the prepit pattern and the grooves in the data area simultaneously by a single laser beam, it becomes necessary to split a cutting laser beam into a sub-beam for forming the prepit pattern and another sub-beam for cutting the groove.

However, since the grooves are spaced apart a distance of an order of 1.5 µm, it is extremely difficult to match the relative position of the two sub-beams so that the clock pits are accurately positioned at the center of the lands between the grooves.

It is therefore necessary to measure the deviation between the pits and the grooves after cutting to feed it back to a mastering process to adjust the relative position between the two sub-beams to assure cutting in as accurate a manner as possible.

However, there have not been made any investigations into the art of measurement of the deviation and hence the method for measuring the deviation has not been established to date.

In view of the above-depicted status of the art, it is an object of the present invention to provide a method for measuring the deviation between the center of wobble pits and the center of the grooves in a simplified manner for feeding the measured value of the deviation promptly to a mastering process.

DISCLOSURE OF THE INVENTION

For accomplishing the above object, the present invention provides a method for measuring a deviation between the centerline between circumferentially extending grooves and a control prepit pattern composed of a clock pit and a pair of wobble pits extending along a spirally or circumferentially extending recording track or tracks on an optical disc The grooves are formed on both sides of said recording track. The method includes sweeping an optical beam along a land between the grooves under tracking control and measuring the deviation between the centerline between the grooves and the control prepit pattern based on a difference in a playback output from the pair of the wobble pits, or includes sweeping an optical beam so that playback outputs from the wobble pits are equal and measuring the deviation between the centerline between the grooves and the control prepit pattern by a tracking error signal at a land between the grooves.

If, with an optical disc of the sample servo tracking system having grooves in its data area, the modulation indices of the wobble pits are measured under continuous tracking control of the center or land between the grooves, a difference is produced between the measured values of the modulation indices if deviation is present between the center of the wobble pits and the center between the grooves.

Therefore, by measuring the difference of the modulation indices of the wobble pits, the amount and the direction of the deviation between the center of the wobble pits and the center between the grooves may be found.

If tracking control is made of the grooves and a tracking offset is adjusted so that the modulation indices of the wobble pits become equal to each other, the tracking error signal has an offset quantity (dc component).

The amount of the deviation between the center of the wobbled pits and the center between the grooves may also be found from the offset quantity and push-pull signals of the grooves.

According to the present invention, the amount of deviation (offset) between the center of the wobble pits and the center between the grooves may be easily measured by electrical signals without destructive inspection. The measurement time may be shortened as compared to that in destructive inspection and the measured results may be promptly fed back to the mastering process.

The present invention also has an advantage that measurement may be made using an evaluating unit of the conventional continuous servo system without the necessity of employing a new evaluating unit of the sampled servo system.

BEST MODE FOR CARRYING OUT THE INVENTION

Figure 1:
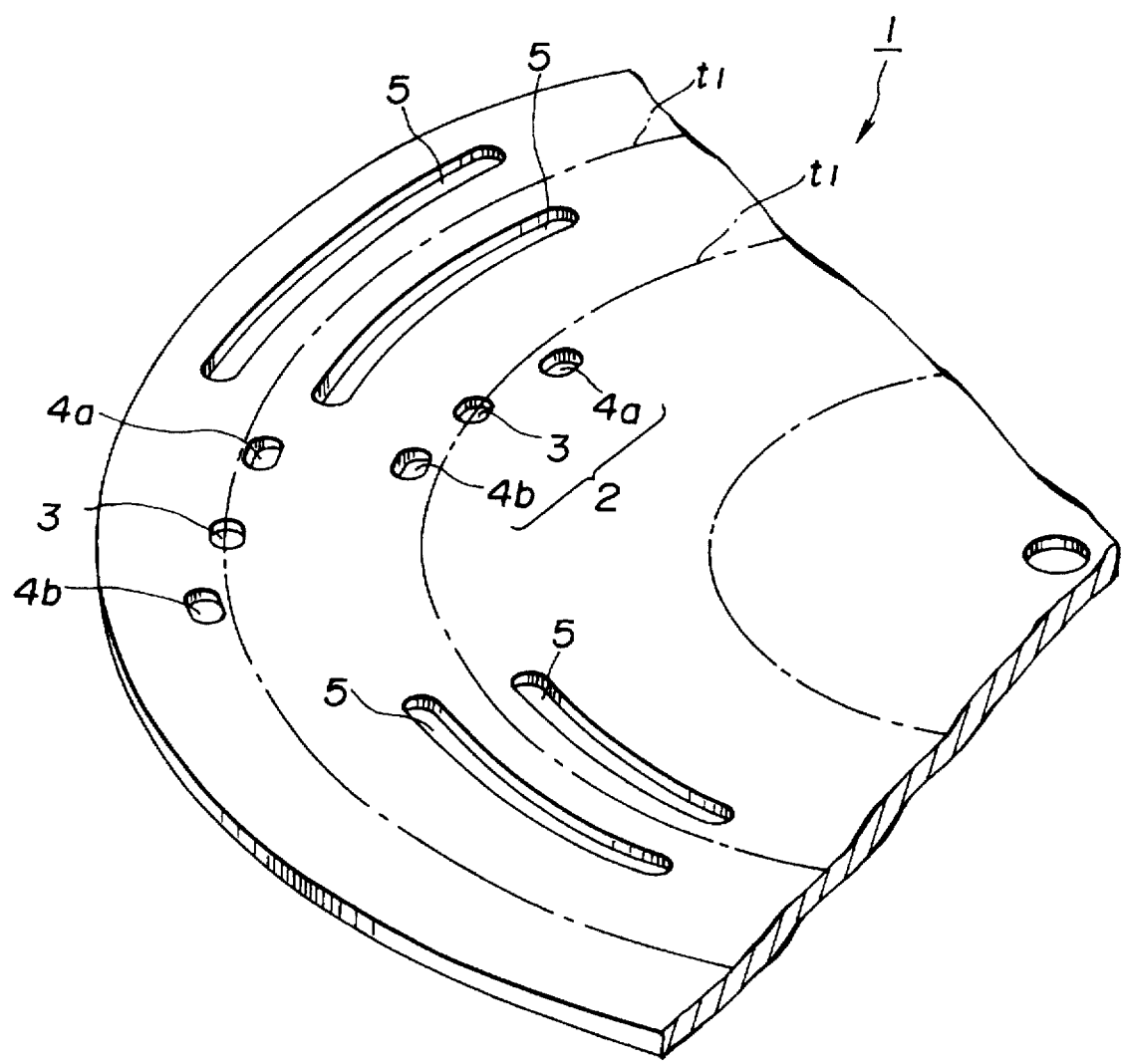
FIG. 1 is a schematic perspective view showing essential parts of an embodiment of a disc substrate of the sample servo tracking system.

Referring to the drawings, a concrete embodiment of the present invention will be explained in detail.

An optical disc to be measured according to the present invention is an optical disc of the sample servo tracking system. Thus a control prepit pattern 2 is formed on a disc substrate 1, with an arcuate centerline ($t_1$) of a spirally or concentrically extending information signal recording track as a reference line, as shown in FIG. 1.

The prepit pattern 2 is made up of a clock pit 3 for clock synchronization and a pair of wobble pits 4a, 4b for generating a tracking error signal. The clock pit 3 is arrayed on the centerline ($t_1$) of the recording track and the wobble pits 4a, 4b are arrayed with a certain distance on both sides of the centerline ($t_1$).

With the above disc substrate 1, there are formed grooves 5 as recesses in a region between the recording tracks arrayed radially of the substrate 1, that is in a region offset from the information signal recording track region.

These grooves 5 are significantly longer in length and deeper in depth than the prepit pattern 2 and formed at a suitable distance from and on both sides of the centerline of the recording track.

The grooves 5 play the part of assuring optimum mold release properties for the stamper at least the portion of the disc substrate 1 provided with the prepit pattern 2. A plurality of the grooves 5 are formed with a suitable length and a suitable interval at the positions not affecting the recording track in consideration of the mold release properties of the stamper.

Since the prepit pattern 2 and the grooves 5 are separately cut during the mastering process in the course of preparation of the optical disc, it is necessary to measure the deviation between the prepit pattern 2 and the grooves 5 in the completed optical disc and to feed it back promptly to the mastering process on occurrence of unusualness.

The method for measuring the deviation between the prepit pattern 2 and the grooves 5 is hereinafter explained.

Figure 2A:
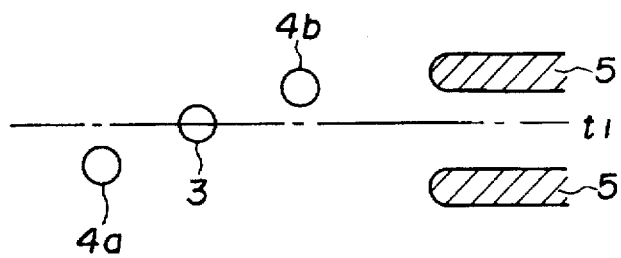
FIG. 2 is a schematic view showing an ideal relative position between the prepit pattern and the grooves along with RF signals and tracking error signals.
Figure 2B:
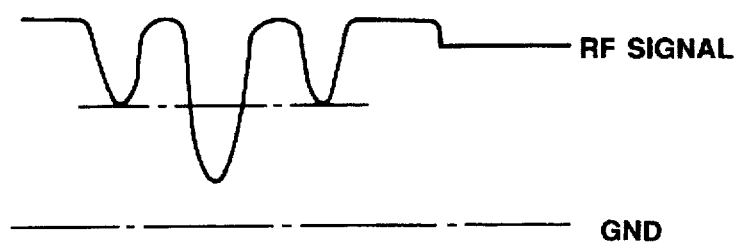
Figure 2C:

In an ideal state of the disc substrate 1, that is when the centerline $t_1$ of the recording track, i.e. the centerline between the wobble pits 4a, 4b, is in correct coincidence with a centerline $t_1$ of the recording track, as shown at A in FIG. 2, there is also a correct coincidence in the degree or index of modulation of the wobble pits 4a, 4b in RF signals (B in FIG. 2), as measured by applying a tracking to the centerline $t_2$ of the grooves 5 by a push-pull method.

Figure 3A:
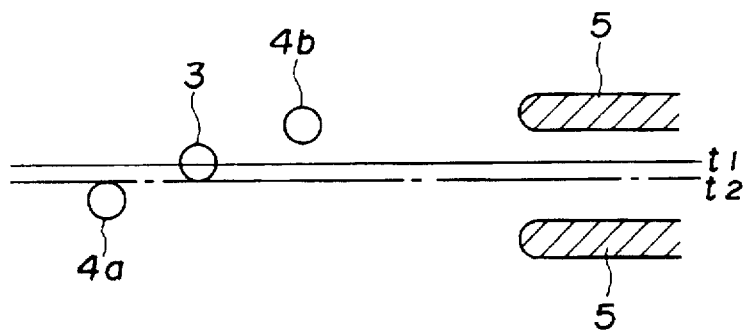
FIG. 3 is a schematic view showing a relative position between the prepit pattern and the grooves, which is subject to deviation, along with RF signals and tracking error signals.
Figure 3B:
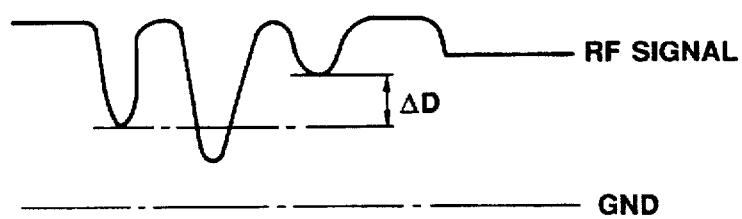
Figure 3C:
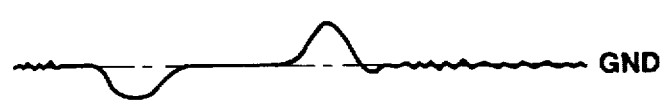

However, in an actual disc substrate 1, the centerline of the wobble pits 4a, 4b is not necessarily coincident with the centerline between the grooves 5, in a majority of cases, such that a certain deviation is produced as shown at A in FIG. 3.

If the centerline between the wobble pits 4a, 4b is deviated from the centerline between the grooves 5, an RF signal as shown at B in FIG. 3 is generated. That is, the degree of modulation of the wobble pit 4a in a direction towards the centerline $t_2$ of the grooves 5 is increased, while that of the wobble pit 4b in a direction away from the centerline $t_2$ of the grooves 5 is decreased.

Since the difference Δd between the degree of modulation of the wobble pit 4a and that of the wobble pit 4b is proportional to the deviation between the centerline $t_2$ of the grooves 5 and the centerline $t_1$ of the recording track, or the centerline between the wobble pits 4a, 4b, the deviation may be found by measuring the signal (Δd).

If the centerline between the grooves 5 is deviated in the opposite direction to FIG. 3, the degree of modulation of the wobble pit 4a represented in the RF signals is decreased, while that of the wobble pit 4b represented in the RF signal is increased, thus allowing interpretation of the direction of deviation of the centerline $t_2$.

While the above is the method for measuring the deviation from the difference in the degree of modulation of the wobble pits 4a, 4b, it is also possible to adjust a tracking offset to measure the deviation from the offset quantity of the tracking error signals.

In the ideal state shown in FIG. 2, the tracking error signal as measured in the grooves 5 is reduced substantially to zero, as shown at C in FIG. 2.

Conversely, if the centerline between the wobble pits 4a, 4b is not coincident with the centerline between the groves 5, the tracking error signal becomes substantially equal to zero for the grooves 5, as shown at C in FIG. 3. However, a difference is produced in the modulation indices of the wobble pits 4a and 4b. This indicates that the laser beam of the pickup unit is passed through the centerline between the grooves 5 without being passed through the centerline of the wobble pits 4a, 4b.

Thus the tracking offset is adjusted for causing the laser beam to pass on the centerline between the wobble pits 4a, 4b. That is, tracking is shifted so that the modulation indices of the wobble pits 4a, 4b, represented by the RF signals, are equal to each other, as shown at A in FIG. 4.

Figure 4A:
FIG. 4 is a waveform diagram showing RF signals and tracking error signals when tracking is shifted for coinciding the modulation indices of the wobble pits.
Figure 4B:
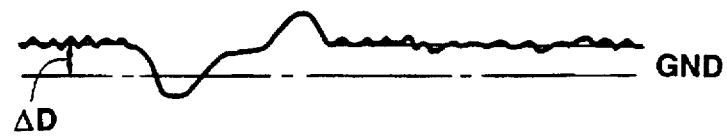

The tracking error signal then has an offset quantity ΔD, as shown at B in FIG. 4. The deviation between the centerline $t_2$ between the grooves 5 and the centerline $t_1$ of the recording track or the centerline between the wobble pits 4a, 4b may be found by computation using the offset quantity ΔD and push-pull signals at the grooves 5.

Although the present invention has been explained with reference to the method for measurement for the optical disc, the present invention is not limited to this specific embodiment. For example, the above-described measurement may also be performed on the stamper.

What is claimed is:

1. A method for measuring a deviation between a centerline between circumferentially extending grooves and a control prepit pattern having a clock pit and a pair of wobble pits extending along a spirally or circumferentially extending recording track on an optical disc, said grooves being formed on both sides of said recording track, said method comprising the steps of:

providing an optical disc having grooves, a control prepit pattern and a recording track, the grooves being formed on both sides of said recording track, and the control prepit pattern having a clock pit and a pair wobble pits;

positioning an optical beam at a center of a land between said grooves under a tracking control; and measuring a deviation between a centerline between said grooves and the control prepit pattern based on a difference in a playback output from said pair of wobble pits and on a playback output from said grooves.

2. A method for measuring a deviation between a centerline between circumferentially extending groves and a control prepit pattern having a clock pit and a pair of wobble pits extending along a spirally or circumferentially extending recording track on an optical disc, said grooves being formed on both sides of said recording track, said method comprising the steps of:

providing an optical disc having grooves, a control prepit pattern and a recording track, the grooves being formed on both sides of said recording track, and the control prepit pattern having a clock pit and a pair wobble pits;

positioning an optical beam so that playback outputs from said pair of wobble pits are equal; and then measuring a deviation between a centerline between the grooves and the control prepit pattern by an offset value of a tracking error signal at a land between said grooves.

3. A method for measuring a deviation between a centerline between circumferentially extending grooves and a control prepit pattern of claim 1, wherein:

the optical disc provided in the providing step has the grooves spaced apart from the prepit pattern in a track direction.

4. A method for measuring a deviation between a centerline between circumferentially extending grooves and a control prepit pattern of claim 2, wherein:

the optical disc provided in the providing step has the grooves spaced apart from the prepit pattern in a track direction.

* * * * *